W. V. TURNER.
DUPLEX AUTOMATIC AND STRAIGHT AIR BRAKE.
APPLICATION FILED NOV. 14, 1906.
965,614.
Patented July 26, 1910.
2 SHEETS—SHEET 1.
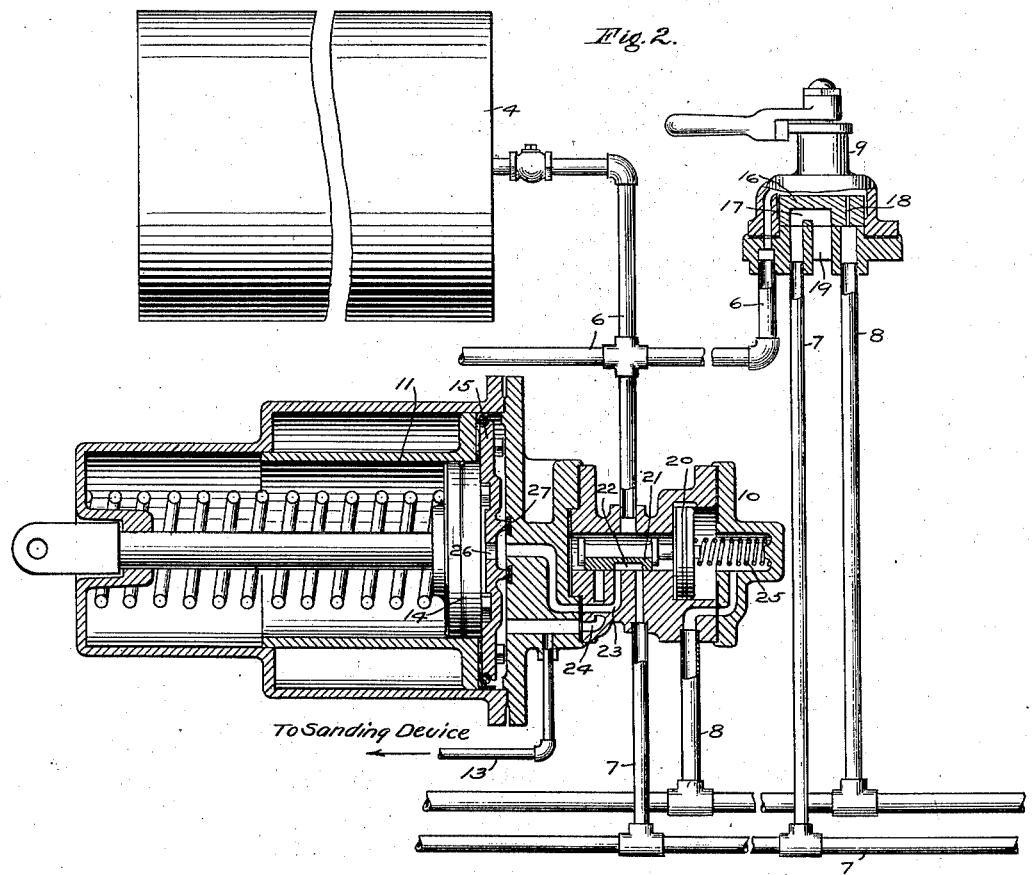
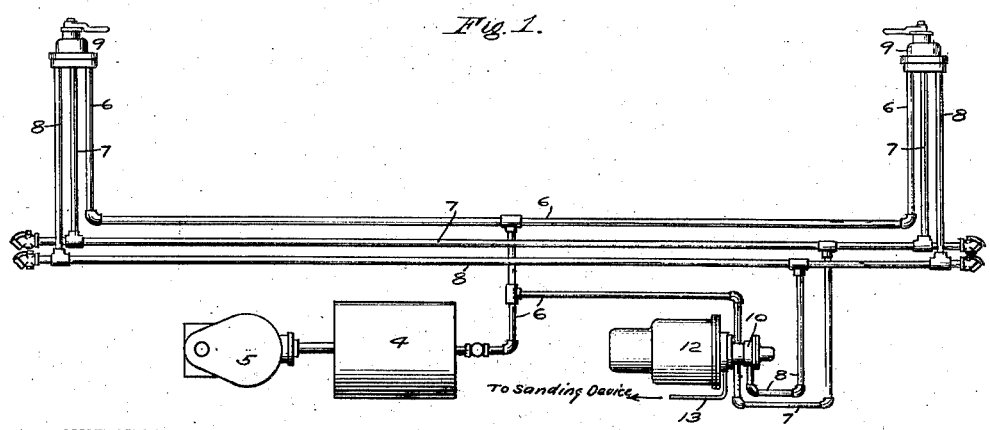
WITNESSES
INVENTOR
Walter V. Turner
by E. Wright
Att'y.

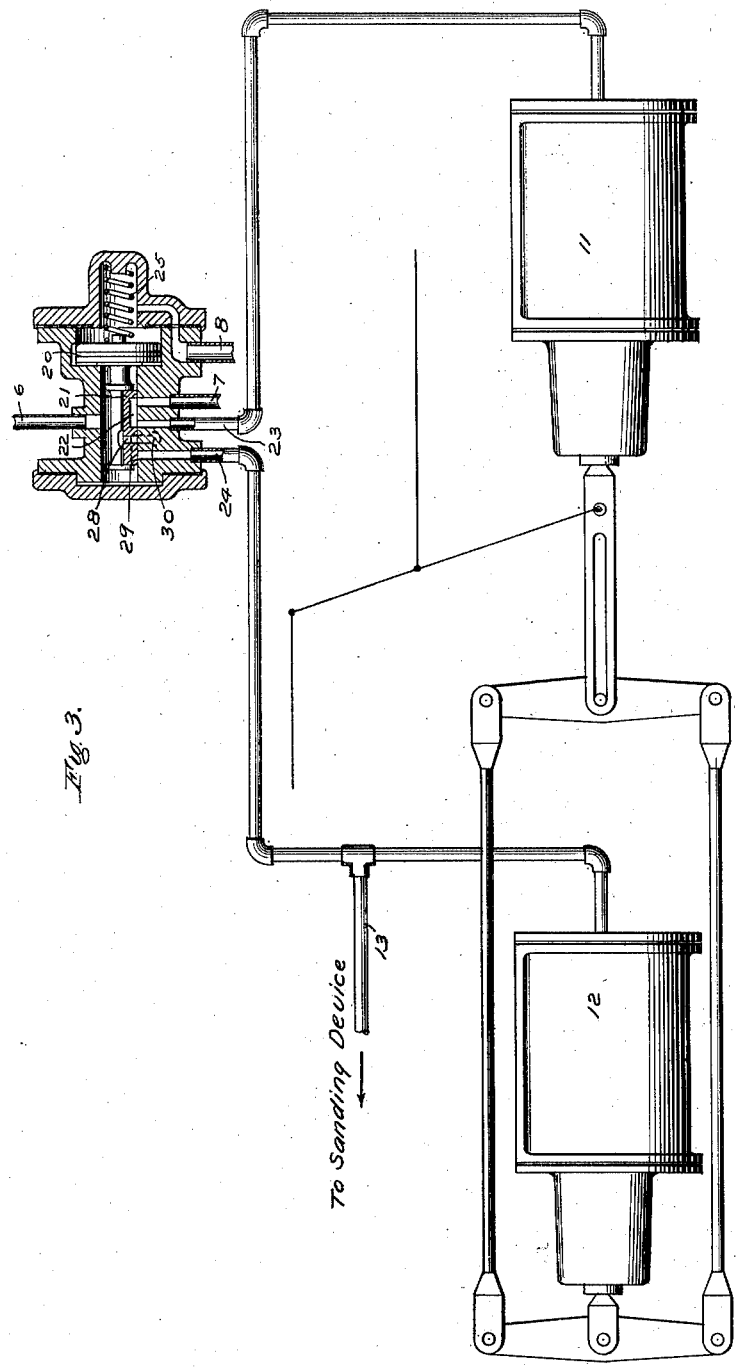

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

DUPLEX AUTOMATIC AND STRAIGHT-AIR BRAKE.

965,614.  Specification of Letters Patent.  Patented July 26, 1910.

Application filed November 14, 1906. Serial No. 343,357.

*To all whom it may concern:*

Be it known that I, WALTER V. TURNER, a citizen of the United States, residing at Edgewood, in the county of Allegheny and State of Pennsylvania, have invented new and useful Improvements in Duplex Automatic and Straight-Air Brakes, of which the following is a specification.

This invention relates to a combined automatic and straight air brake apparatus for railway cars, and more particularly to that type of brake in which direct or straight air is employed for service applications, and an automatic valve device is operated by a reduction in train pipe pressure to supply air to the brake cylinder in emergency applications.

This form of equipment is especially adapted to be employed in traction service, as in the case of electric cars, where the cars are operated singly some of the time, but at other times are coupled up in trains of two or three cars, as a motor car and trailer, or two or more motor cars.

The principal object of my present invention is to provide an improved apparatus of this character, and having a larger brake cylinder area subject to the fluid pressure in emergency applications than in the straight air service applications of the brakes, whereby the braking power in service may be finely graduated and not be excessive, while a much greater braking power is obtainable in emergencies for stopping in the shortest possible time.

Another object is to provide an improved apparatus, whereby the sanding device will be automatically operated in emergency applications of the brake.

In the accompanying drawings; Figure 1 is a diagrammatic elevation of a car brake equipment embodying my improvements; Fig. 2 a similar diagrammatic view of a portion of said apparatus on a larger scale, the brake valve, emergency valve and duplex brake cylinder being shown in vertical section; and Fig. 3 a view showing a modified arrangement of brake cylinders and emergency valve device for coöperating therewith.

As shown in the drawings, this apparatus, as heretofore used, comprises a reservoir 4, which may be supplied with compressed air from any convenient source, such as motor-driven pump 5, a reservoir pipe 6 extending to the motorman's brake valve 9, one at each end of the car, a train pipe 8 leading from the brake valves to piston chamber of the emergency valve device 10, and a straight air pipe leading from the brake valves to and through the emergency valve device to the brake cylinder for supplying and releasing air in service applications.

The brake valve chamber communicates with the reservoir through pipe 6 and the valve seat has ports communicating with pipes 7 and 8 respectively and exhaust port 19, while the rotary valve 16 is provided with a through port (not shown) for supplying air to the pipe 7 in service position, a port 18 for feeding the train pipe 8 in normal or release position, and a cavity 17 for connecting the straight air pipe 7 with the exhaust port 19.

The train pipe and straight air pipe are usually extended to the ends of the car and provided with cocks and couplings for connection with corresponding pipes on adjacent cars when the same are coupled together.

The automatic emergency valve comprises a casing communicating with the reservoir pipe 6 and containing a piston 20 and slide valve 21 having a cavity 22 for normally affording communication from the straight air pipe 7 to the port or pipe 23 leading to the brake cylinder, the spring 25 acting to normally hold the valve in this position. When a sudden reduction is made in train pipe pressure the piston 20 moves the valve 21 to cut off communication through the straight air pipe and brake cylinder port 23 and to open the reservoir supply directly into the brake cylinder for applying the brakes with maximum pressure in emergency applications.

Heretofore this apparatus has been employed with a single brake cylinder having a constant piston area for both straight air service and automatic emergency applications, but according to my improvement I propose to employ a larger brake cylinder area in the emergency than in the service application. This may be accomplished in various ways, such as providing a service brake cylinder of suitable size for straight air applications, and a separate larger brake cylinder to which air is supplied by the automatic valve device only in emergency applications, or air may be supplied to both brake cylinders in emergency applications and to only one in service, in which case the brake cylinders may be of the same size or of different sizes, as desired.

In Figs. 1 and 2 I have shown a brake cylinder construction which may be termed a compound or duplex brake cylinder, wherein the smaller or service brake cylinder 11 containing piston 14 is mounted on the large piston 15 and inside the large emergency brake cylinder 12. A port 26 leads through the head 15 of the large piston into the small cylinder and is surrounded by a raised flange 27, which normally engages a gasket in the head of the large cylinder and makes a tight joint around the port 23 for supplying straight air from pipe 7 directly into the service brake cylinder without permitting the same to act on the face of the large piston. The emergency valve is provided with an additional port 24 leading into the large or emergency brake cylinder 12, which port is adapted to be opened by the movement of the valve 22 to supply air from the reservoir to the large brake cylinder in emergency applications.

In straight air service applications, air is supplied to and released from the small or service brake cylinder 11 by the usual movements of the brake valve 9 in controlling the ports communicating with the straight air pipe 7, the small piston 14 only moving out while the large piston remains seated against the head of the large cylinder.

When a sudden reduction is made in train pipe pressure, either automatically by a break-in-two, or by the opening of a conductor's valve, or the brake valve, the piston 20 of the emergency valve device moves back, compressing spring 25 and actuating valve 21 to cut off communication from the straight air pipe, and opening emergency port 24 for supplying air from the reservoir to the large brake cylinder and thereby applying the brakes with full maximum pressure.

If desired, the service and emergency brake cylinders may be arranged separate, as shown in Fig. 3, and the emergency valve may be designed to supply air to only one or to both of said cylinders, as shown, for instance, by a port 28 in slide valve 21, which registers with port or pipe 23 when the port or passage 25 is uncovered. In this case the greater brake cylinder area operating in emergencies comprises the combined area of both cylinders.

In order to release after an emergency application, the brake valve is returned to normal release position, Fig. 2, and air from the reservoir equalizes through port 18 and train pipe 8 on the piston 20, whereupon the spring 25 moves the valve to its normal position and the cavity 22 connects brake cylinder port 23 with the straight air pipe 7, which is then open to the atmosphere through ports 16 and 19 in the brake valve. The duplex brake cylinder construction shown in Fig. 2 has the advantage that the air from the emergency brake cylinder may be released through the service port 23, since this is open into said cylinder when the large piston has been pushed out, but with the modification shown in Fig. 3 the valve 21 may be provided with a small cavity 29 for connecting the port 24 to a small exhaust port 30, as indicated in dotted lines, for releasing the emergency brake cylinder 12 to the atmosphere when the valve returns to its normal position.

In order to increase the adhesion for the purpose of making a quick stop in emergency applications of the brakes, it is a customary practice to apply sand to the rails at such times, and means operated by the movement of the brake valve to emergency position for automatically sanding the rails have heretofore been proposed, but with such devices no sand is automatically supplied in case of an emergency application produced automatically or by any other means than the brake valve. It has also been proposed to take air from the brake cylinder to operate the blower of the sanding device when the brake cylinder is provided with some means for maintaining its pressure against leakage, but in this case the sander is operated automatically at all brake applications, both service and emergency, which is often not desirable. According to this feature of my improvement, a pipe 13 is shown as leading from the emergency brake cylinder connection to the blower of a sanding device (not shown), whereby sand will be automatically applied to the rails at each emergency application of the brakes, but not in service applications. There will be no material reduction in the pressure in the emergency brake cylinder due to the air flowing to the sanding device, since the reservoir communicates with the emergency brake cylinder in emergency applications and is supplied by the air pump.

Within the scope of my invention any suitable or preferred form of sanding device may be employed which is governed or operated by the air pressure supplied to the emergency brake cylinder.

Having now described my invention, what I claim as new and desire to secure by Letters Patent, is:—

1. In a fluid pressure brake, the combination with a brake cylinder, and a brake valve for controlling the supply of straight air to the brake cylinder in service applications, of a valve device for supplying air to a larger brake cylinder area in emergency applications.

2. In a fluid pressure brake, the combination with a service brake cylinder, a straight air pipe, a train pipe, and a brake valve for controlling the supply of air to the service brake cylinder through the straight air pipe, of an automatic valve device operated by a variation in train pipe pressure for supplying air to a larger brake cylinder area.

3. In a fluid pressure brake, the combination with a service brake cylinder, and a brake valve for controlling the supply of air to said brake cylinder in service applications, of an emergency brake cylinder, and an automatic valve device for supplying air to said emergency brake cylinder in emergency applications.

4. In a fluid pressure brake, the combination with a service brake cylinder, a straight air pipe, and a brake valve for controlling the supply of air to said brake cylinder, of an emergency brake cylinder, a train pipe, and an automatic valve device operated by a variation in train pipe pressure for supplying air to said emergency brake cylinder.

5. In a fluid pressure brake, the combination with a reservoir, a service brake cylinder, and a brake valve for controlling the supply of air from said reservoir to the service brake cylinder, of an emergency brake valve, and an automatic valve device for supplying air from said reservoir to the emergency brake cylinder.

6. In a fluid pressure brake, the combination with a reservoir, a service brake cylinder, a straight air pipe, and a brake valve for controlling the supply of air from said reservoir to said pipe, of a train pipe, an emergency brake cylinder, and an automatic valve device operated by a reduction in train pipe pressure to supply air from said reservoir to the emergency brake cylinder.

7. In a fluid pressure brake, the combination with a reservoir, a train pipe, a straight air pipe, a service brake cylinder and a brake valve having means for controlling the supply of air from the reservoir to the straight air pipe and to the train pipe, of an emergency brake cylinder, and an automatic valve device operated by variations in train pipe pressure for controlling the supply of air from said reservoir to the emergency brake cylinder.

8. In a fluid pressure brake, the combination with a reservoir, a train pipe, a straight air pipe, and a service brake cylinder communicating therewith, of an emergency brake cylinder, an automatic valve device operated by a reduction in train pipe pressure to supply air from said reservoir to the emergency brake cylinder, and a brake valve having connections with the reservoir, the train pipe, and the straight air pipe.

9. In a fluid pressure brake, the combination with a service brake cylinder, a straight air pipe communicating therewith, and means for controlling the supply of air to said straight air pipe, of an emergency brake cylinder, and an automatic valve device for cutting off communication with the straight air pipe and supplying air to said emergency brake cylinder in emergency applications.

10. In a fluid pressure brake, the combination with a service brake cylinder, a straight air pipe communicating therewith, and means for controlling the supply of air to said pipe, of an emergency brake cylinder, a train pipe, and an automatic valve device operated by a reduction in train pipe pressure for cutting off communication from the straight air pipe and supplying air to said emergency brake cylinder.

11. In a fluid pressure brake, the combination with a reservoir, a service brake cylinder, a straight air pipe, and a brake valve for controlling the supply of air to said pipe, of a train pipe, an emergency brake cylinder, and an automatic valve device operated by a reduction in train pipe pressure for closing communication with the straight air pipe, and opening communication from the reservoir to the emergency brake cylinder.

12. The combination with a fluid pressure brake apparatus having a brake cylinder to which fluid is supplied in emergency applications only, of means operated by the fluid thus supplied to the emergency brake cylinder for controlling a sanding device.

13. The combination with a fluid pressure brake apparatus having a service brake cylinder and an emergency brake cylinder, of means operated by fluid supplied to the emergency brake cylinder for controlling a sanding device.

14. The combination with a fluid pressure brake apparatus having a service brake cylinder and an emergency brake cylinder, of a sanding device, and a pipe connection from the emergency brake cylinder to said sanding device.

15. In a fluid pressure brake, the combination with a brake cylinder and a brake valve for controlling the direct supply of fluid under pressure to the brake cylinder, of an automatic valve device for effecting an application of the brakes with greater power.

16. In a fluid pressure brake, the combination with a brake cylinder and a brake valve having ports for supplying fluid under pressure to the brake cylinder, of a train pipe, and means operated by a reduction in train pipe pressure for applying the brake with greater power.

In testimony whereof I have hereunto set my hand.

WALTER V. TURNER.

Witnesses:
R. F. EMERY,
J. B. MACDONALD.